United States Patent
Zimmer et al.

(10) Patent No.: US 12,521,265 B2
(45) Date of Patent: Jan. 13, 2026

(54) POSTERIOR BRACING SYSTEM WITH INTERCHANGEABLE EXTENSION PANELS

(71) Applicant: Aspen Medical Products, LLC, Irvine, CA (US)

(72) Inventors: Erik Zimmer, Oceanside, CA (US); Jane Price, Anaheim, CA (US)

(73) Assignee: Aspen Medical Products, LLC, Irvine, CA (US)

( * ) Notice: Subject to any disclaimer, the term of this patent is extended or adjusted under 35 U.S.C. 154(b) by 415 days.

(21) Appl. No.: 18/162,345

(22) Filed: Jan. 31, 2023

(65) Prior Publication Data

US 2023/0240878 A1 Aug. 3, 2023

Related U.S. Application Data

(60) Provisional application No. 63/305,672, filed on Feb. 1, 2022, provisional application No. 63/305,678, filed on Feb. 1, 2022.

(51) Int. Cl.
*A61F 5/02* (2006.01)
*A61F 5/055* (2006.01)

(52) U.S. Cl.
CPC .............. *A61F 5/022* (2013.01); *A61F 5/026* (2013.01); *A61F 5/028* (2013.01); *A61F 5/055* (2013.01)

(58) Field of Classification Search
CPC ................. A61F 5/02–03; A61F 5/055; A61F 2005/0167; A61F 5/05883; A61F 5/05891; Y10S 128/23
USPC .......................... 602/12, 18, 19; 128/DIG. 23
See application file for complete search history.

(56) References Cited

U.S. PATENT DOCUMENTS

| | | | |
|---|---|---|---|
| 2,973,030 A | * | 2/1961 | Matthewson ........... A61F 5/055 2/300 |
| 5,964,722 A | | 10/1999 | Goralnik et al. |
| 6,500,137 B1 | | 12/2002 | Molino et al. |
| 6,676,620 B2 | | 1/2004 | Schwenn et al. |
| 7,001,348 B2 | | 2/2006 | Garth et al. |
| 7,608,052 B1 | | 10/2009 | Baker |
| 8,172,779 B2 | | 5/2012 | Ingimundarson et al. |
| 8,216,167 B2 | | 7/2012 | Garth et al. |
| 8,556,840 B2 | | 10/2013 | Burke et al. |
| 8,795,214 B1 | | 8/2014 | Conti |
| 9,220,625 B2 | | 12/2015 | Ingimundarson et al. |
| 9,504,596 B1 | | 11/2016 | Kozersky |
| 10,070,985 B2 | | 9/2018 | Glazener et al. |

(Continued)

FOREIGN PATENT DOCUMENTS

FR 2992168 A1 12/2013

OTHER PUBLICATIONS

PCT/US2023/012134 filed Feb. 1, 2023 International Search Report and Written Opinion dated Apr. 14, 2023.

(Continued)

*Primary Examiner* — Rachael E Bredefeld
*Assistant Examiner* — Seth R. Brown
(74) *Attorney, Agent, or Firm* — Rutan & Tucker, LLP (57) ABSTRACT

An orthopedic brace featuring a posterior bracing system. The posterior bracing system comprises (i) a posterior panel including a plurality of locking slots and (ii) a first extension panel removably coupled to the posterior panel. The first extension panel includes a plurality of locking protrusions corresponding to and removably coupled to the plurality of locking slots.

21 Claims, 11 Drawing Sheets

(56) References Cited

U.S. PATENT DOCUMENTS

| | | |
|---|---|---|
| 10,231,862 B2 | 3/2019 | Summit et al. |
| 10,238,524 B2 | 3/2019 | Burke et al. |
| 11,273,065 B2 | 3/2022 | Garth |
| 2002/0198481 A1 | 12/2002 | Humphries |
| 2003/0208147 A1 | 11/2003 | Reinecke et al. |
| 2004/0077981 A1 | 4/2004 | Weaver et al. |
| 2004/0220503 A1 | 11/2004 | Kozersky |
| 2010/0168630 A1 | 7/2010 | Cropper et al. |
| 2010/0298749 A1 | 11/2010 | Garth et al. |
| 2011/0077567 A1 | 3/2011 | Bledsoe |
| 2012/0209162 A1 | 8/2012 | Bar-Natan et al. |
| 2012/0253251 A1 | 10/2012 | Thornton |
| 2014/0100501 A1* | 4/2014 | Burke ............ A61F 5/026 602/19 |
| 2014/0276311 A1 | 9/2014 | Hollister et al. |
| 2014/0371646 A1 | 12/2014 | Kozersky |
| 2015/0290019 A1 | 10/2015 | Garth et al. |
| 2016/0045387 A1 | 2/2016 | Lee et al. |
| 2016/0089554 A1* | 3/2016 | Perner ............ A62B 35/0018 182/3 |
| 2016/0151190 A1* | 6/2016 | Lurssen ............ A61F 5/0125 601/16 |
| 2016/0206467 A1 | 7/2016 | Glace et al. |
| 2016/0324678 A1 | 11/2016 | Ingimundarson et al. |
| 2017/0348134 A1 | 12/2017 | Joseph et al. |
| 2018/0303699 A1* | 10/2018 | Romo ............ A61H 3/00 |
| 2018/0325184 A1 | 11/2018 | Roberts |
| 2018/0353314 A1 | 12/2018 | Grim et al. |
| 2019/0070033 A1* | 3/2019 | Heronen ............ A61F 5/022 |
| 2020/0179153 A1* | 6/2020 | Wang ............ A61F 5/028 |
| 2022/0226139 A1* | 7/2022 | Poker ............ A61F 5/022 |

OTHER PUBLICATIONS

U.S. Appl. No. 18/162,328, filed Jan. 31, 2023 Non-Final Office Action dated Mar. 31, 2025.

U.S. Appl. No. 18/162,367, filed Jan. 31, 2023, Non-Final Office Action dated Jun. 16, 2025.

U.S. Appl. No. 18/162,383, filed Jan. 31, 2023, Non-Final Office Action dated Mar. 31, 2025.

* cited by examiner

POSTERIOR BRACING SYSTEM WITH INTERCHANGEABLE EXTENSION PANELS

CROSS-REFERENCE TO RELATED APPLICATIONS

This application claims the benefit of priority on U.S. Provisional Application No. 63/305,672 filed Feb. 1, 2022 and U.S. Provisional Application No. 63/305,678 filed Feb. 1, 2022, the entire contents of both of which are incorporated by reference herein.

FIELD

Embodiments of the disclosure relate to the field of medical devices. More specifically, one embodiment of the disclosure relates to an orthopedic brace and interchangeable extension panels to alter the functionality of the orthopedic brace.

GENERAL BACKGROUND

The following description includes information that may be useful in understanding the described invention. It is not an admission that any of the information provided herein is prior art or relevant to the presently claimed invention, or that any publication specifically or implicitly referenced is prior art.

Orthopedic braces (orthoses) usually need to be adjusted or customized in some manner to conform to the body part(s) being braced, and then properly positioned. A typical orthosis commonly has at least two portions, a rigid portion supporting a body part, and a flexible or semi-flexible portion securing the orthosis to the body. One type of orthopedic brace is referred to as a "thoracic-lumbar-sacral orthosis" or by the acronym "TLSO."

A TLSO is a brace that limits movement in a wearer's spine from the thoracic region (mid-back region) to the wearer's sacrum (lower-back region). At the same time, the TLSO allows a wearer's neck to move freely. This type of brace is normally used to provide support and stabilization of the spine after a back injury and/or surgery, and in some cases, may be utilized to address spinal pathologies.

Besides on the donning process, a common problem associated with conventional TLSOs is the singularity in function. Stated differently, as described above, TLS orthopedic braces allow the wearer's neck to move freely, and in response to the need to temporarily immobilize the neck, a different orthopedic brace needs to be placed on the user. This would require another donning process, where the patient may be "log rolled" (moved face-down to face-up or vice versa) multiple times in order to adjust and fit the next orthopedic brace. The changing of brace types is painful to the patient and time consuming for the orthotist. Avoidance of complex (and in some cases painful) donning processes would ensure more effective usage of orthopedic braces.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

Embodiments of the present disclosure generally relate to an orthopedic brace including a posterior bracing system. According to one embodiment of the disclosure, the posterior bracing system features an interchangeable, extension panel to provide upper back and neck support. As described herein, the orthopedic brace may constitute any type of lumbar sacral orthosis (LSO), including a standard LSO (lower back brace belt) or other orthoses configured to provide greater patient immobilization, such as a thoracic LSO (TLSO), or a cervical TLSO (CTLSO) as described below.

When deployed as a TLSO or CTLSO, the posterior bracing system for the orthopedic brace may be configured in accordance with a layered component architecture including a posterior panel, a posterior cover, and a pulley cover. Each of these components may be formed with a rigid material, such as hardened plastic for example, to provide greater stiffness for immobilization of the patient. Herein, the posterior panel is shaped and sized to rest again the mid-to-lower portions of the patient's back to partially immobilize the spine of the patient. The posterior cover is sized to overlay a midsection area of the posterior panel, while the pulley cover is sized to overlay a midsection area of the posterior cover. This layered architecture creates distinct chambers for housing different components forming the orthosis fastening subsystem, including at least (i) a telescopic lateral panel at least partially maintained within a first chamber formed between the posterior panel and the posterior cover and (ii) a pulley subsystem and adjustable belt at least partially maintained within a second chamber formed between the posterior cover and the pulley cover.

According to one embodiment of the disclosure, as an illustrative example, the posterior panel includes locking slots, strap guides, and a stabilization slot. More specifically, the posterior panel may include a pair of locking slots sized to receive locking protrusions formed within each extension panel and strap guides for retention of attachment straps. The strap guides are positioned to align with a first set of strap slots implemented at specific locations on the extension panel to allow a strap to pass through the extension panel before being secured at the strap guide. The stabilization slot is sized to receive a stability engagement member as described below. All of the extension panels include the above-described locking protrusions and attachment straps.

One of the extension panels, namely a cervical extension panel, is further configured to include components that allow a thoracic LSO (TLSO) to be reconfigured as a cervical TLSO (CTLSO) without re-donning the patient with the CTLSO. Stated differently, operating as a TLSO, the posterior bracing system may be adapted with a first extension panel or a second extension panel, which features the locking protrusions, a first set of strap slots to receive a support strap for axilla placement and fastening, and a second set of strap slots to receive a support strap for over-the-shoulder placement and fastening. The cervical extension panel further includes a connection rod support member, which features a first end proximate to a fastening member for attachment to a back portion of a cervical collar and a second end deployed as a cantilever member including a stability engagement member for insertion and engagement with the stabilization slot.

I. Terminology

In the following description, certain terminology is used to describe aspects of the invention. For example, the term "member" may be construed as a structural component of an orthopedic brace. In certain situations, a member may include a component covered by soft goods such as one or more textiles, one or more fabrics (woven fabrics and/or non-woven fabrics), leathers, and/or another covering material. These soft goods may feature "loop" type fasteners or other variants to which a "hook" type fastener may be attached or may feature a hook-type fastener for attachment to a loop-type fastener. In other situations, the member may be soft goods attached to another structural component of the orthopedic brace such as a textile or fabric sewn to form together.

The term "chamber" is a partially enclosed housing, namely a structure having partially enclosed perimeter except for one or more openings, such as at least two openings at opposite sides along the periphery. As a result, a partially enclosed chamber operates as a structure that is configured to secure, maintain and protect orthosis fastening subsystem components.

The term "attach" and other tenses of the term (attached, attaching, etc.) may be construed as physically connecting a first member to a second member. A "fastener" may be construed as any physical component that is used to attach different members together. An illustrative example of different types of fasteners and fastening techniques may include, but are not limited or restricted to snaps, buttons, clasps, buckles, adhesives, sewing, heat sealing (or melting), gluing, knitting, or other physical coupling techniques such as a hook and loop connection.

The terms "rigid" or "rigidity" with respect to a member or portion of a member may be construed as the member being configured to at least partially resist bending or deformation. According to this definition, different lengths of a given structure and composition can be rigid at a shorter length, and flexible at a longer length. As used herein, the term "rigid" with respect to a member or portion of a member may be construed as the member could be permanently deformed or broken if bent or twisted by at least 90°. Examples of a rigid member may include, but is not limited or restricted to, the posterior panel and/or the extension panel.

Finally, the terms "or" and "and/or" as used herein are to be interpreted as inclusive or meaning any one or any combination. As an example, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure is to be considered as an example of the principles of the invention and not intended to limit the invention to the specific embodiments shown and described.

II. General Architecture

Figure 1A:
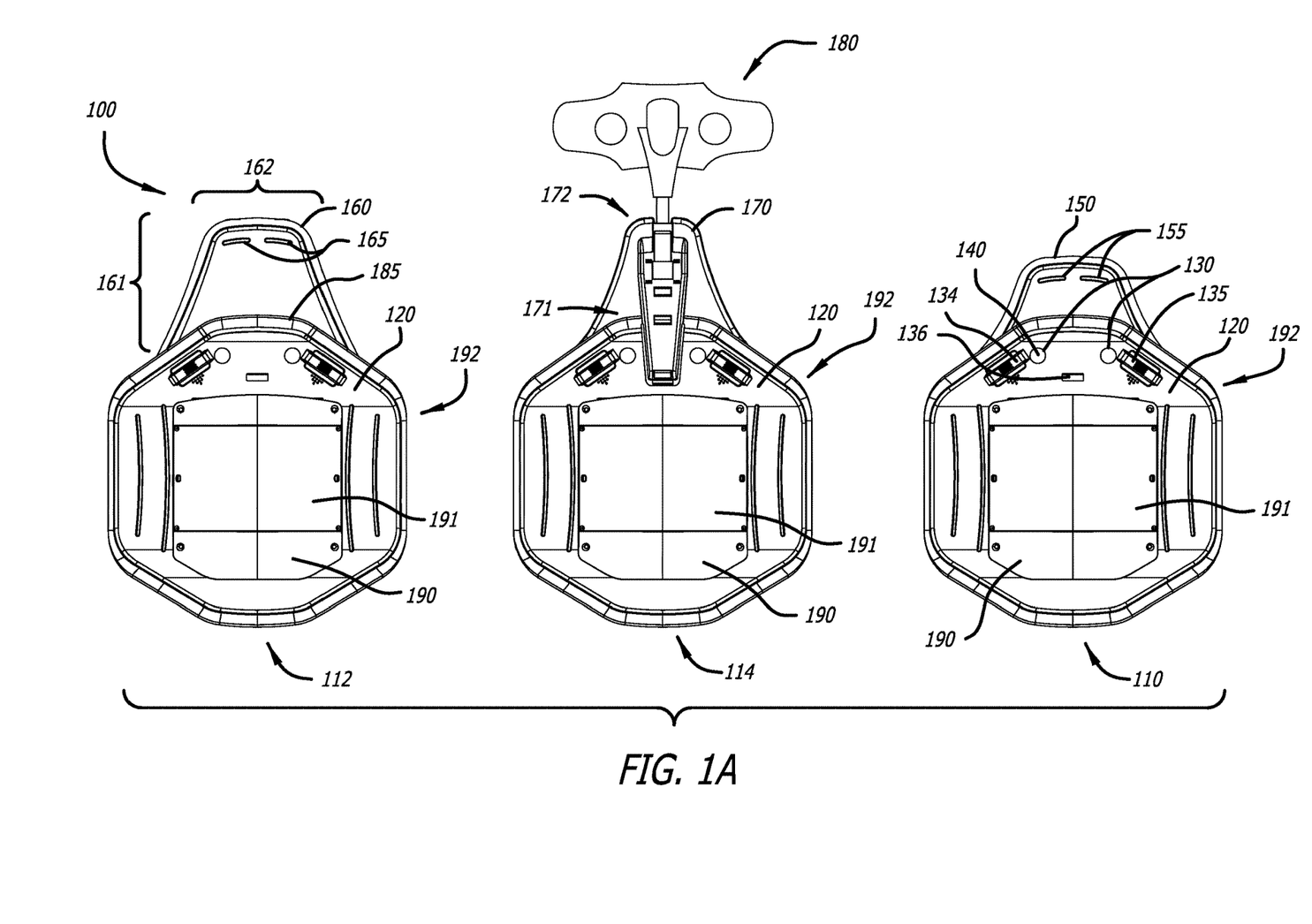
FIG. 1A is a perspective rear view of an exemplary embodiment of a first group of posterior bracing systems, each including a first type of posterior panel and different types of extension panels.

Referring to FIG. 1A, perspective rear views of exemplary embodiments of a first group of posterior bracing systems 100 is shown, where each of the posterior bracing systems 100 features a first type of posterior panel and a different type of extension panel. More specifically, for illustrative purposes, the first group of posterior bracing systems 100 includes a first posterior bracing system 110, a second posterior bracing system 112, and a third posterior bracing system 114. Each of these posterior bracing systems 110, 112 and 114 includes a first type of posterior panel 120 that is generally octagonal in shape with a first prescribed length and width so that the first posterior panel 120, when placed on a patient, rests against and supports the thoracic and lumbar regions of the patient's spine.

According to one embodiment of the disclosure, the first posterior panel 120 includes a plurality of locking slots 130, a plurality of strap guides 132 (e.g., a first strap guide 134 and a second strap guide 135), and a stabilization slot 136. More specifically, the first posterior panel 120 may include (i) the pair of locking slots 130, which are sized to receive locking protrusions 140 formed within each extension panel 150, 160, 170 and (ii) the strap guides 132 for retention of attachment straps (not shown). The strap guides 132 are positioned to align with strap slots implemented at specific locations on each of the extension panels to allow a strap to pass through the extension panel 150 before looped around and secured at a corresponding strap guide 132. As described below, the stabilization slot 136 is sized to receive a stabilization component on the third (cervical) extension panel 170, and otherwise, remains unused by the first or second extension panels 150 and 160.

As further shown and described below, the first posterior panel 120 may be adapted with the first extension panel 150, the second extension panel 160, or the third extension panel 170. The first and second extension panels 150 and 160 are attached to the first posterior panel 120 to operate as a TLSO in which the extension panels 150/160 provide additional support for the upper back and neck regions, while allowing the patient's head to move freely even after the orthopedic brace is donned by the patient. The differences between the first extension panel 150 and the second extension panel 160 is directed to the size of the patient. The first extension panel 150 is a standard size for patients while the second extension panel 160 is elongated (e.g., longer in length 161 and narrower in width 162 in some cases) to account for taller patients. However, the third extension panel 170 may be attached to the first posterior panel 120 to operate as a CTLSO in which the third extension panel 170 is attached to a rear portion of a cervical collar 180 to isolate movement of the patient's head after donning. At its lower region 171, the third extension panel 170 has a substantially similar width as the first and second extension panels 150 and 160. At its upper region 172, the third extension panel 170 is narrower than the first and second extension panels 150 and 160 besides the CTLSO extension 170 lacks strap slots 155 and 165 positioned at the upper region of these extension panels 150 and 160.

As further shown, each of the posterior bracing systems 110/112/114 further features a plurality of structural members layered onto the first posterior panel 120 to create a plurality of chambers therebetween. These structural members may include, but are not limited or restricted to a posterior cover 190 and a pulley cover 191. The posterior cover 190 is coupled to the posterior panel 120 to provide a first protective chamber to house telescopic lateral panels (not shown) extending from the first protective chamber. The pulley cover 191 is coupled to the posterior cover 190 to protect a pulley subsystem (not shown) that resides within a second protective chamber formed between an anterior-facing surface of the pulley cover 191 and a posterior-facing recessed area within the posterior cover 190. The pulley cover 191 is smaller in size (e.g., width and length) than the posterior cover 190 so as to overlay the recessed area of the posterior cover 190 including the pulley subsystem and refrain from covering at least top posterior panel region 192 including the plurality of locking slots 130, the plurality of strap guides 132, and the stabilization slot 136.

Figure 1B:
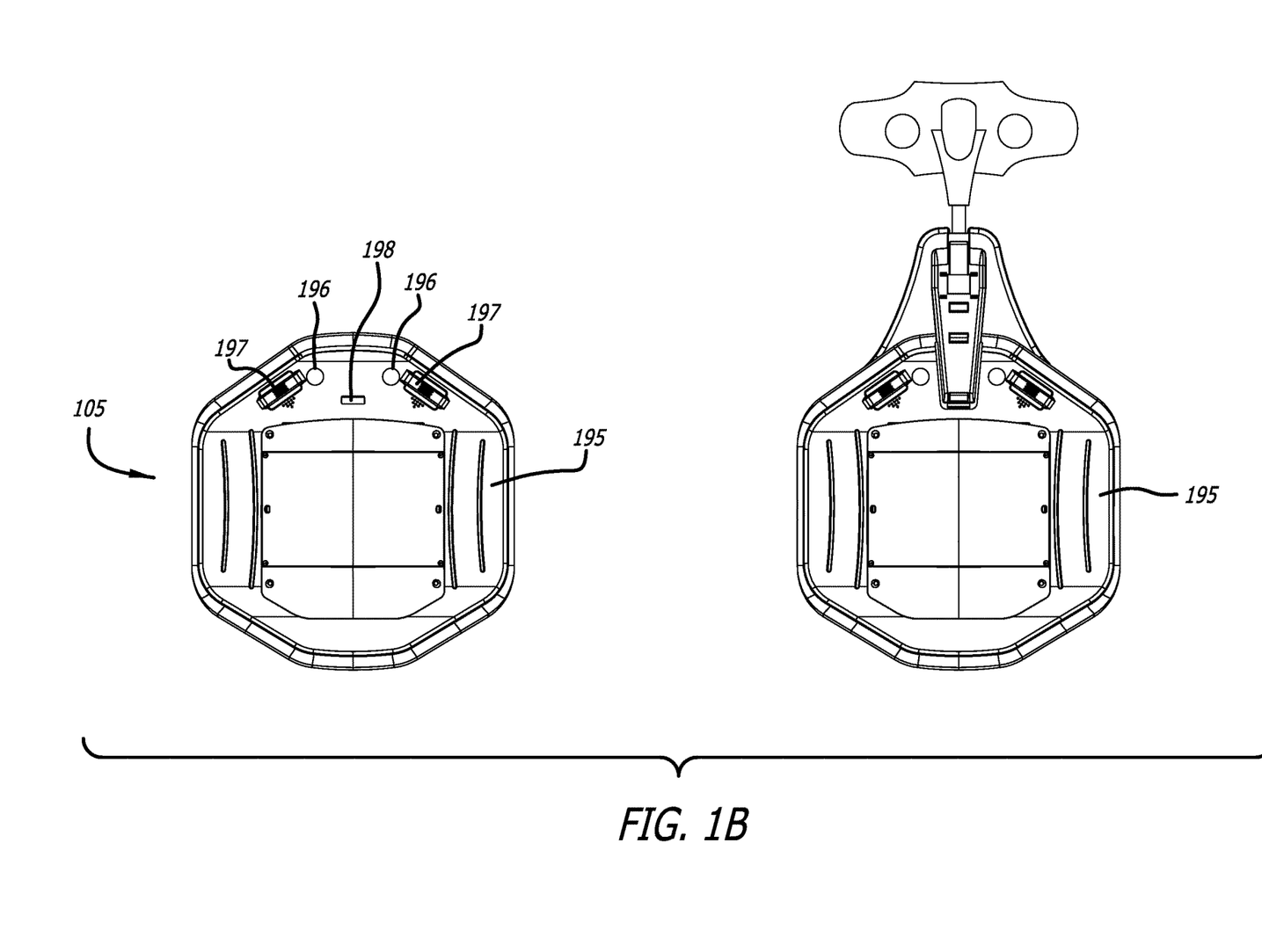
FIG. 1B is a perspective rear view of an exemplary embodiment of a second group of posterior bracing systems, each including a second type of posterior panel and different types of extension panels.

Referring to FIG. 1B, perspective rear views of exemplary embodiments of a second group of posterior bracing systems 105, each including a second type of posterior panel 195 and optionally the third extension panel 170. Similar to the first posterior panel 120, the second posterior panel 195 is generally octagonal in shape but features a second prescribed length and width less than the first prescribed length and width. Hence, this deployment is directed toward smaller sized patients, and thus, only needs to be adapted for the third extension panel 170 to provide CTLSO functionality. Of course, the second posterior panel 195 is configured with locking slots 196, strap guides 197, and a stabilization slot 198, which are positioned in relation to each other identical to the locking slots 130, the strap guides 132 and the stabilization slot 136 provided by the first type of posterior panel 120. This allows for the extension panels 150 and 160, and the third (cervical) extension panel 170, to be interchangeably used between either the first posterior panel 120 or the second posterior panel 195.

Figure 2A:
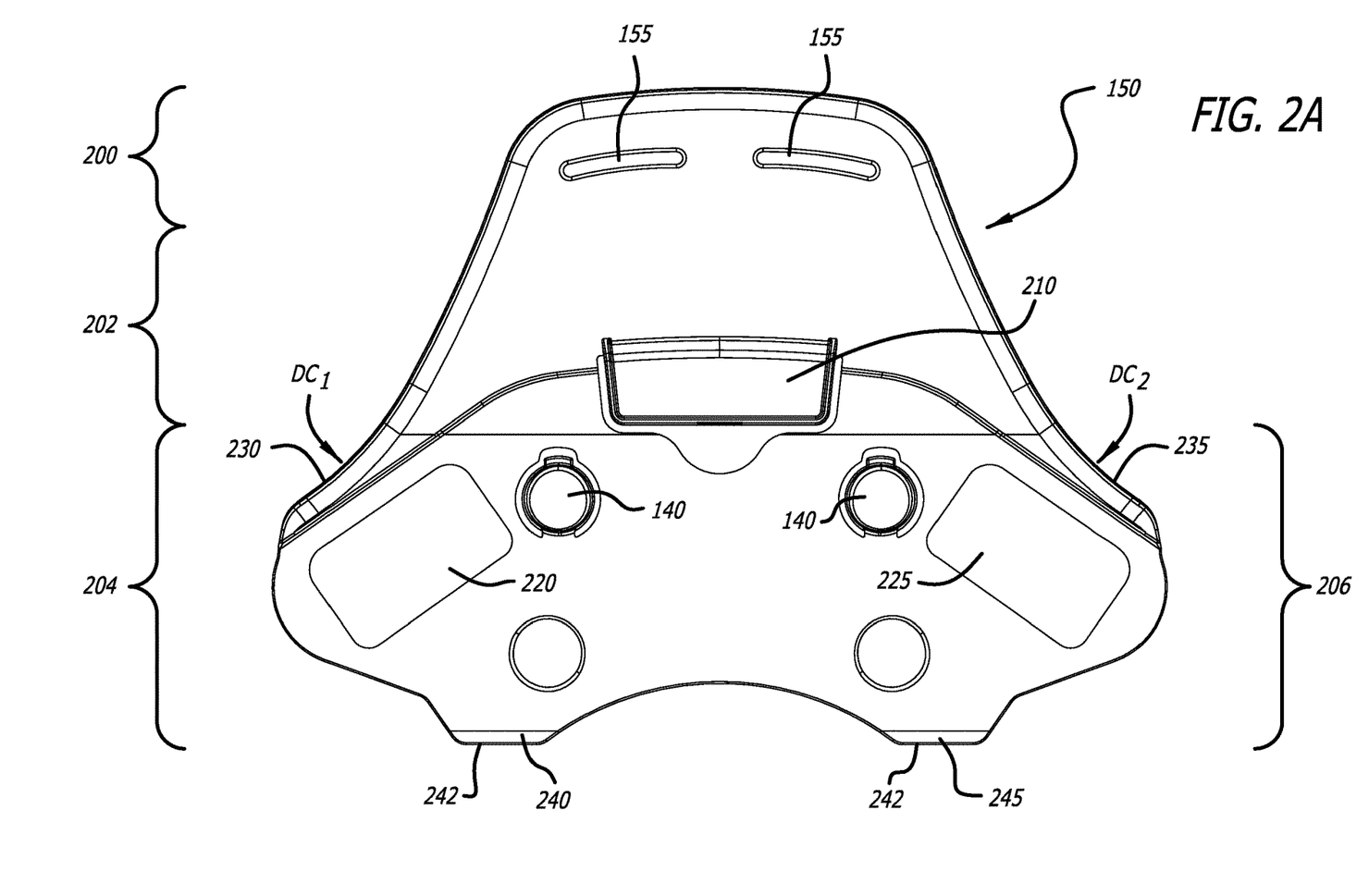
FIG. 2A is a perspective view of a first type of extension panel deployed on a posterior panel as shown in FIG. 1A.

Referring now to FIG. 2A, a perspective view of the first extension panel 150 capable of being deployed on the posterior panel (e.g., first posterior panel 120 in FIG. 1A) is shown. Generally configured with a polygonal shape (e.g., hexagonal configuration), the first extension panel 150 includes an upper region 200, a middle region 202, a left lower region 204 and a right lower region 206. Herein, the upper region 200 of the first extension panel 150 features first and second strap slots 155, which are positioned to receive an adjustable strap positioned over a shoulder of a user. The middle region 202 features a fastening clip 210, which is positioned to be securely coupled to a top edge of the posterior panel 120 when the extension panel 150 is secured to the first posterior panel 120. The fastening clip 210 is positioned (e.g., generally centered) between the locking protrusions 140, which may be inserted into the locking slots 130 of a posterior panel (e.g., the first posterior panel 120) as shown in FIG. 1A.

As still shown in FIG. 2A, the left lower region 204 features a third strap slot 220, which is positioned in alignment with the first strap guide 134 of the first posterior panel 120 when the first extension panel 150 is attached to a posterior panel (e.g., first posterior panel 120). The third strap slot 220 is configured with a width greater than a width of any of the first and second strap slots 155, which allows an adjustment strap to pass unencumbered through the first strap guide 134 positioned within the first posterior panel 120, loop around a member extending across the first strap guide 134, and return to an anterior side of the posterior bracing system 110. Similar in orientation, a fourth strap slot 225 is positioned to be in alignment with the second strap guide 135 when the extension panel 150 is attached to the first posterior panel 120 via the locking slot/protrusion engagement 130/140. A first degree of curvature ($D_{C1}$) for a first perimeter section 230 extending from the left lower region 204 toward the upper region 200 may be substantially equivalent to a second degree of curvature ($D_{C2}$) for a second perimeter section 235 extending from the right lower region 206 toward the upper region 200.

Figure 6:
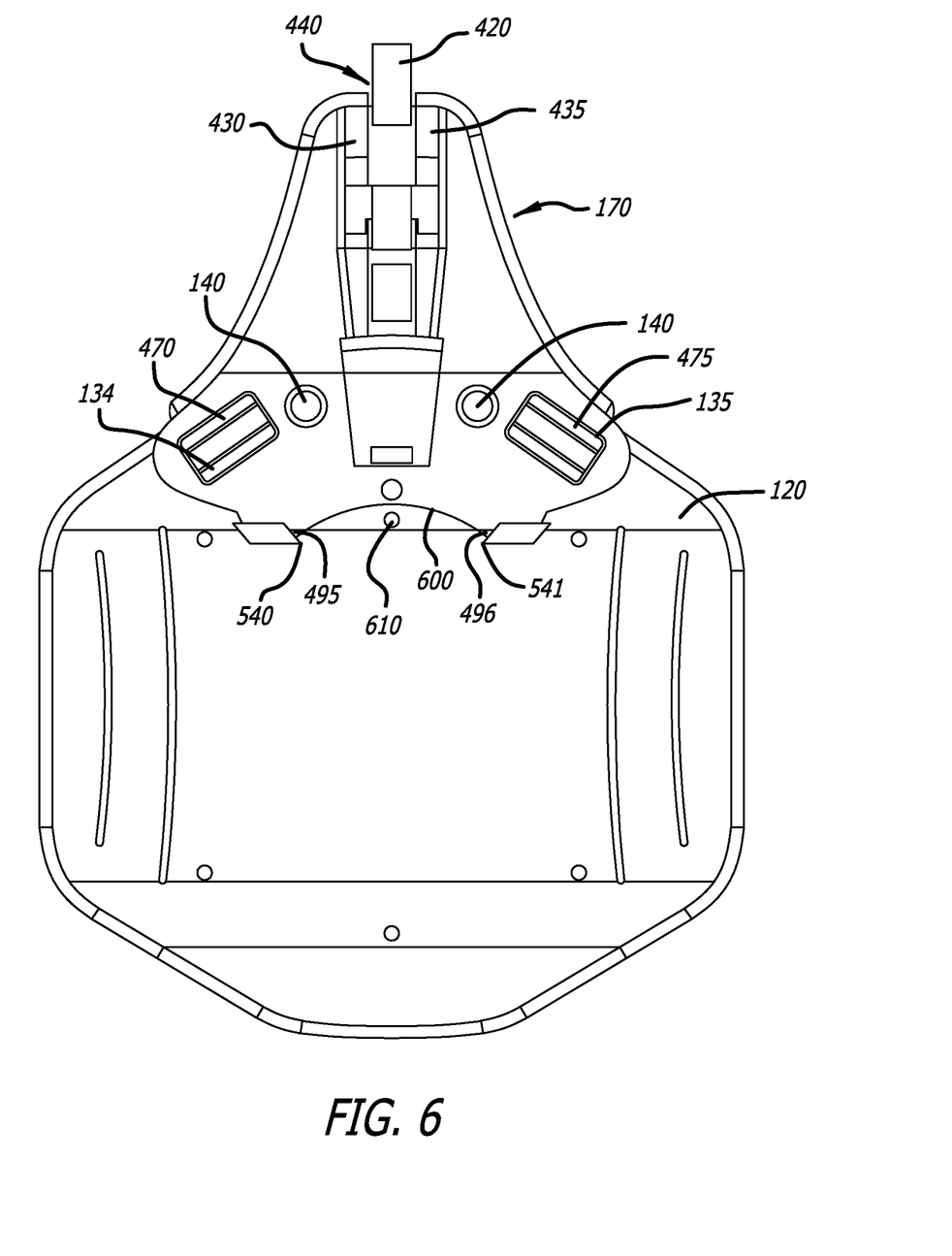
FIG. 6 is a front-facing view of an exemplary embodiment of the third extension panel coupled to the posterior panel of FIGS. 5A-5B.

As shown in FIG. 2A as well as FIG. 6, a first base flange 240 extends from an edge 242 within the left lower region 204 and a second base flange 245 extends from an edge 247 of the right lower region 206 of the extension panel 150. The first and second base flanges 240 and 242 engage with a second plurality of locking slots positioned under the posterior cover 190.

Referring now FIG. 2B, a perspective view of the second type of extension panel 160 (hereinafter, "second extension panel 160"), configured to be attached to a posterior panel as illustrated in FIG. 1A, is shown. Similar to the first extension panel 150, the second extension panel 160 is configured with a polygonal shape (e.g., hexagonal configuration), including an upper region 260, a middle region 262, a left lower region 264 and a right lower region 266. The upper region 260 of the extension panel features a first slot 270 and a second strap slots 272, which are positioned to receive an adjustable strap positioned over a shoulder of a user. The middle region 262 also features a fastening clip 275, which is positioned to be securely coupled to a top perimeter section (edge) 185 of the posterior panel 120 (see FIG. 1A) when the second extension panel 160 is secured to the first posterior panel 120. The fastening clip 275 may be positioned (e.g., centered) between locking protrusions 140, which may be inserted into locking slots of a posterior panel, such as the locking slots 130 of the first posterior panel 120 for example.

Figure 2B:
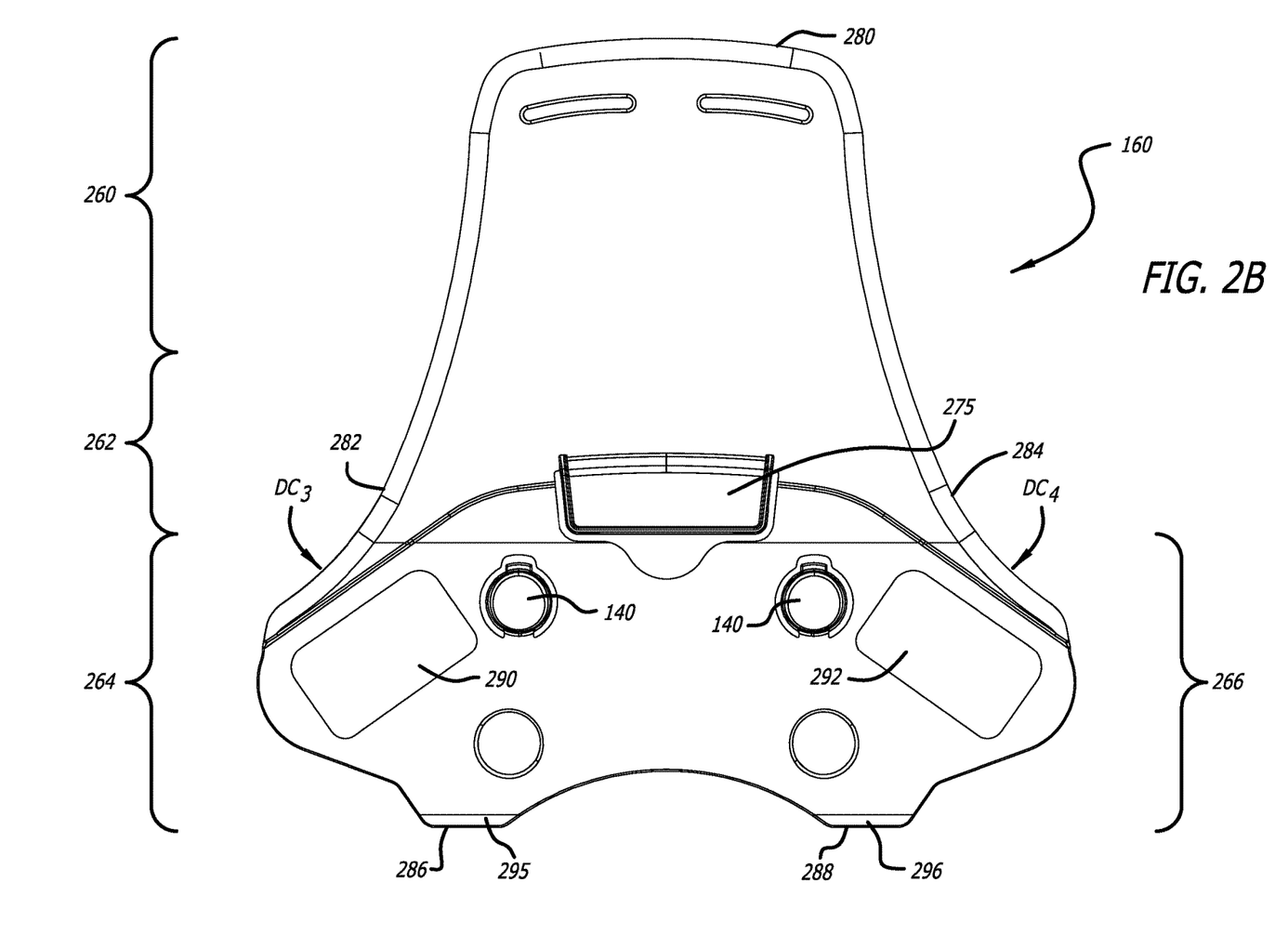
FIG. 2B is a perspective view of a second type of extension panel deployed on a posterior panel as shown in FIG. 1A.

As still shown in FIG. 2B, the left lower region 264 features a third strap slot 290 is positioned to be in (horizontal) alignment with the first strap guide 134 of the first posterior panel 120 when the second extension panel 160 is attached to the first posterior panel 120. Similar in orientation, a fourth strap slot 292 is positioned to be in (horizontal) alignment with the second strap guide 135 when the second extension panel 160 is attached to the first posterior panel 120. A third degree of curvature ($D_{C3}$) for a first perimeter section 282 extending from the left lower region 264 toward the top perimeter section 280 is greater than $D_{C1}$ or $D_{C2}$. Similarly, a fourth degree of curvature ($D_{C4}$) for a second perimeter section 284, extending from the right lower region 266 toward the top perimeter section 280, is greater than $D_{C1}$ or $D_{C2}$. This increased degree of curvature ($D_{C3}$, $D_{C4}$) is based on an increased/decreased slope of the first and perimeter sections 282 and 284, respectively.

Figure 5A:
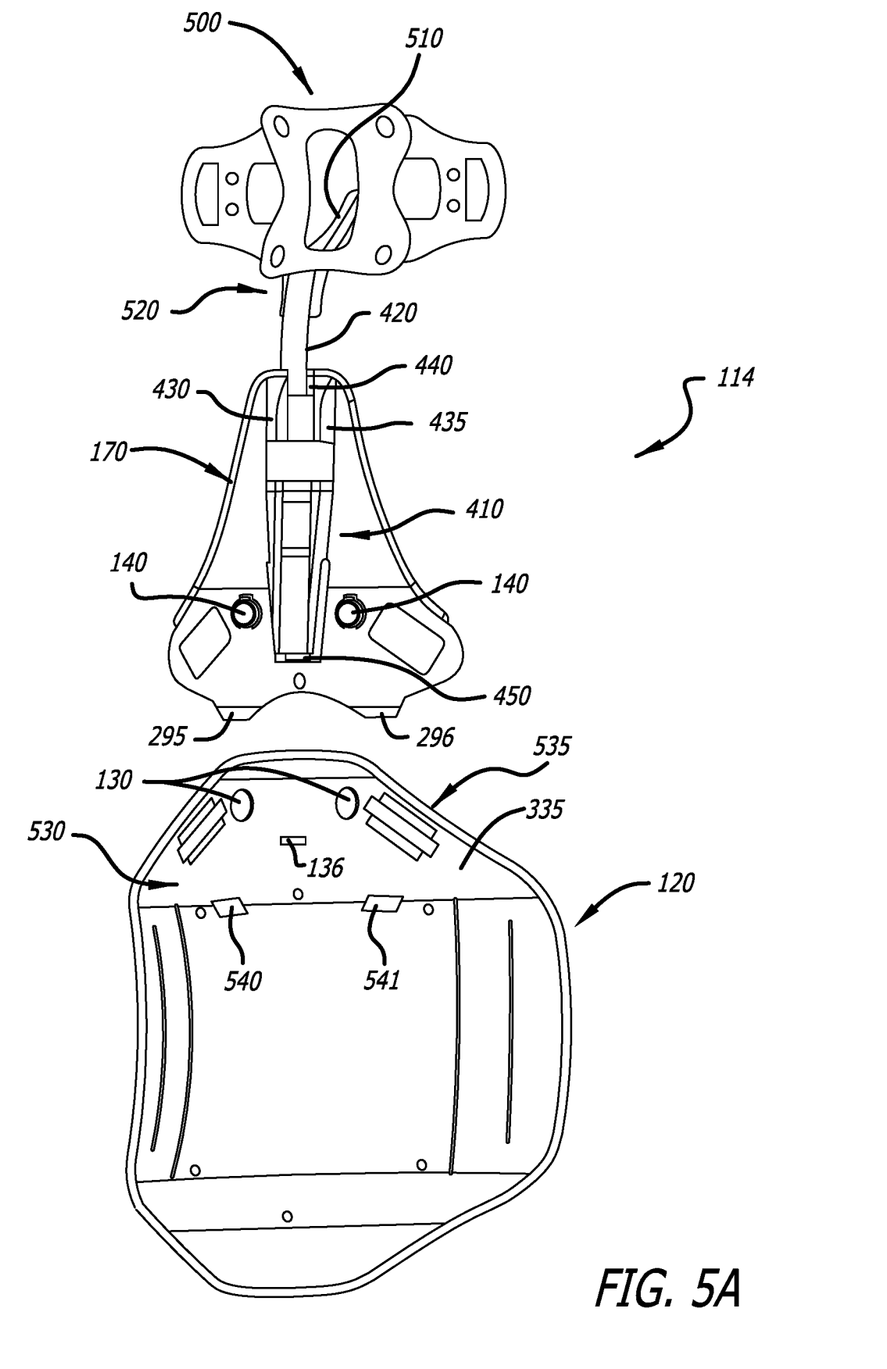
FIG. 5A is a rear-facing view of the orthopedic brace implemented with the third extension panel as shown in FIGS. 4A-4B.

As further shown in FIG. 2B, a first base flange 295 extends from a first lower perimeter section 286 within the left lower region 264 of the second extension panel 160, and a second base flange 296 extends from a second lower perimeter section 288 of the right lower region 266 of the second extension panel 160. The first and second base flanges 295-296 are configured to engage with locking channels of a posterior panel (e.g., locking channels 540-541 of the first posterior panel 120 as shown in FIG. 5A).

Figure 3:
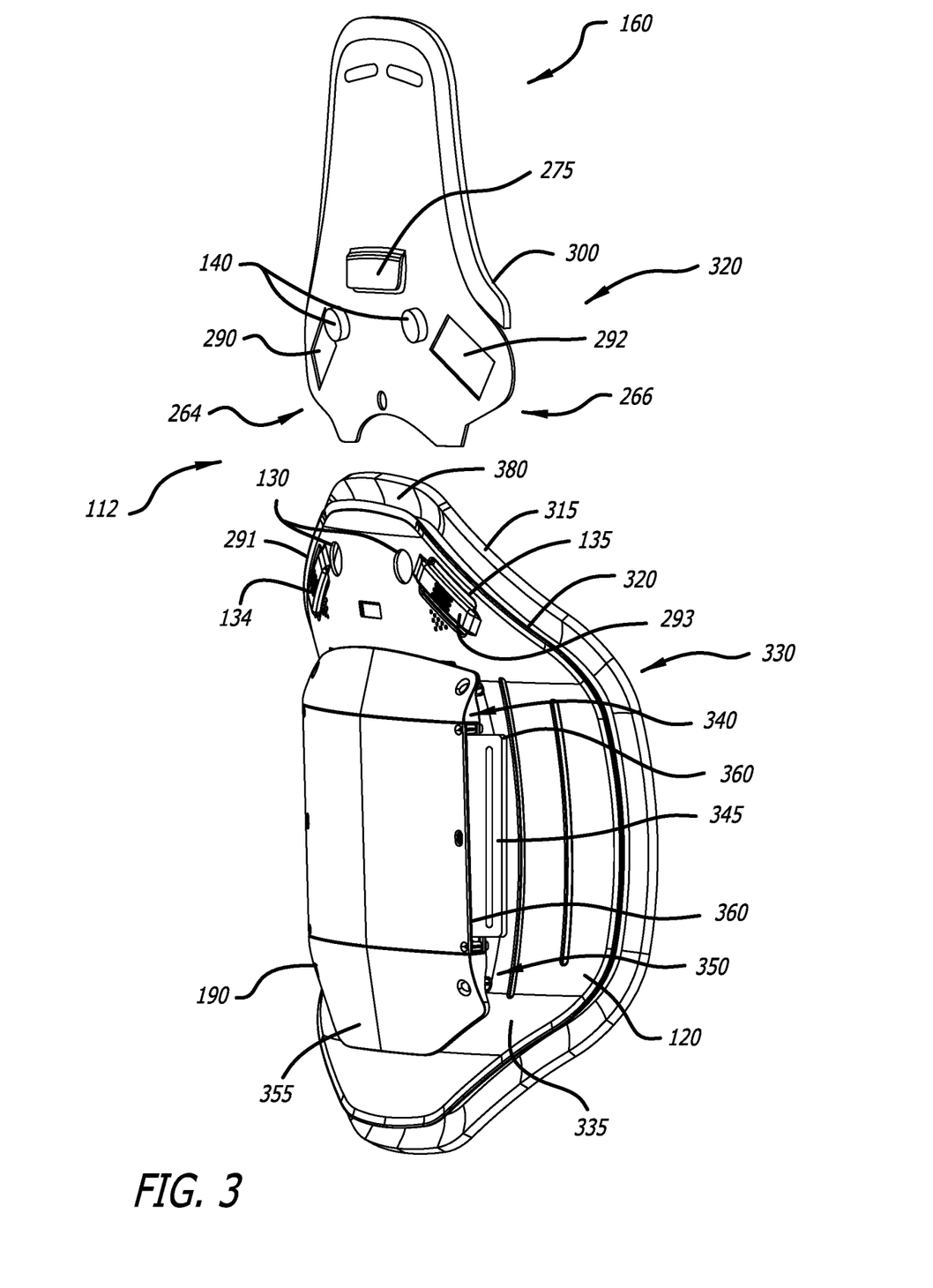
FIG. 3 is an exploded view of the orthopedic brace implemented with the second extension panel as shown in FIG. 2B.

Referring to FIG. 3, an exploded view of the second posterior bracing system 112, which features the first posterior panel 120 implemented with the second extension panel 160 as shown in FIG. 2B, is shown. A first liner 300 is positioned on an anterior side 320 of the second extension panel 160 and a second liner 310 is positioned on an anterior side 330 of the first posterior panel 120. The posterior cover 190 is positioned to cover a portion of a posterior surface 335 of the first posterior panel 120 to house telescopic lateral panels 345 configured to extend from a first protective chamber 340. The first protective chamber 340 is a partially enclosed spacing between the posterior surface 335 of the posterior panel 120 and an anterior surface 350 of the posterior cover 190. An anterior surface 360 of the pulley cover 191 and a recessed area (not shown) formed within a posterior surface 355 of the posterior cover 190 form a second protective chamber 370 to house a pulley subsystem (not shown).

Referring still to FIG. 3, when the second extension panel 160 is attached to the first posterior panel 120, the lower regions 264 and 266 of the second extension panel 160 are positioned below an upper edge 380 of the first posterior panel 120. As a result, when the locking protrusions 140 are inserted into the corresponding locking slots 130, the third and fourth strap slots 290 and 292 are positioned to be in alignment (horizontal) with the first and second strap guides 134 and 135 of the first posterior panel 120. The first strap guide 134 includes a member 291 extending across the first strap guide 134 while the second strap guide 135 includes a member 293 extending across the second strap guide 135. Also, the fastening clip 275 is securely coupled to the top perimeter section (edge) 380 of the posterior panel 120 when the second extension panel 160 is secured to the first posterior panel 120 by inserting the locking protrusions 140 into the corresponding locking slots 130.

Figure 4A:
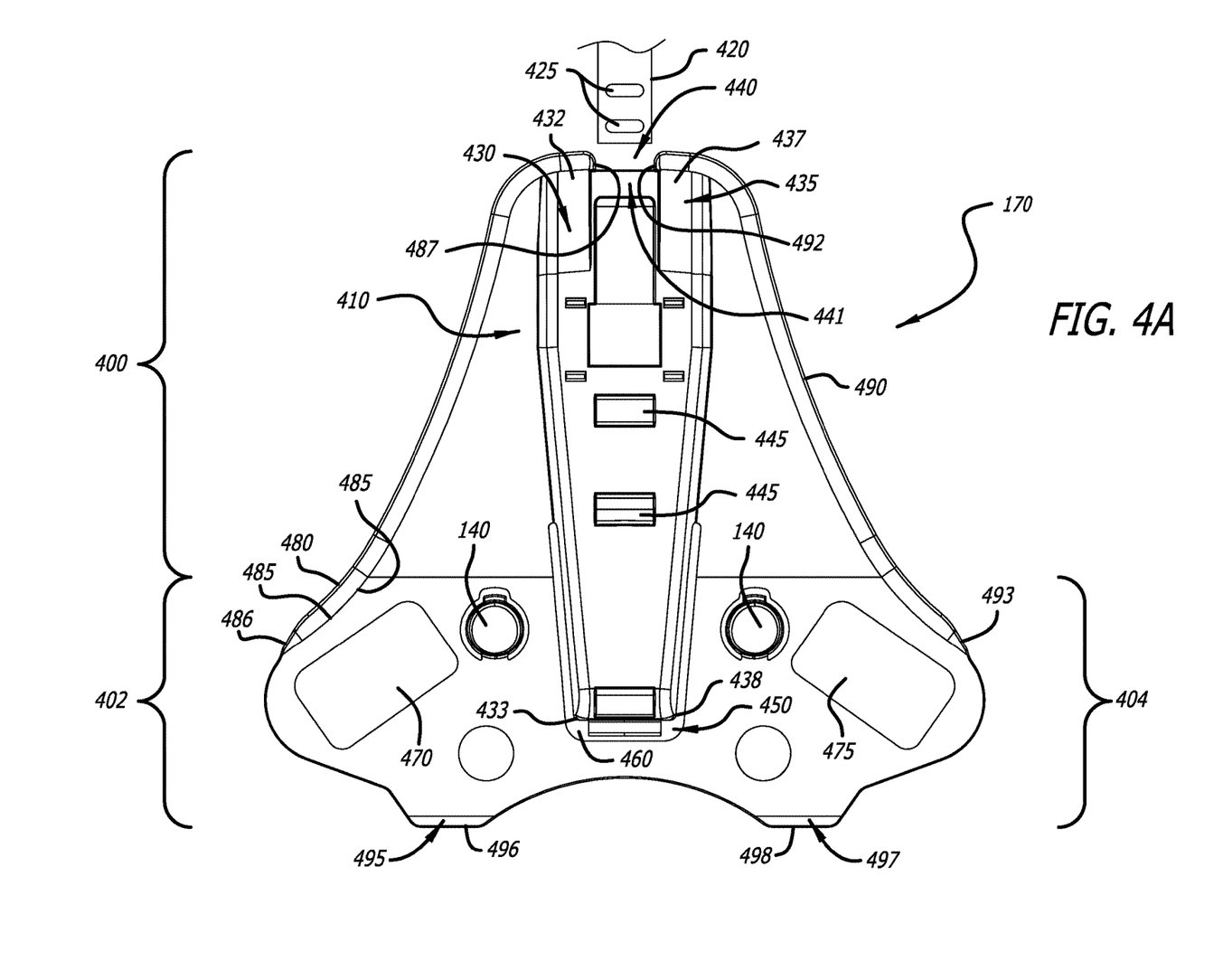
FIG. 4A is a perspective view of a third type of extension panel deployed on a posterior panel as shown in FIGS. 1A-1B.

Referring now to FIG. 4A, a perspective view of a third type of extension panel 170 (hereinafter, "third extension panel 170"), configured to be attached on a posterior panel 120 or 195 as illustrated in FIGS. 1A-1B, is shown. Similar to the second extension panel 160 of FIG. 2B, the third extension panel 170 is configured with a polygonal shape (e.g., hexagonal configuration), including an upper region 400, a left lower region 402 and a right lower region 404. Intersecting the upper region 400 and the lower regions 402/404 of the third extension panel 170, a cantilever support 410 is configured to secure and maintain a cervical collar adjustment rod 420 with height-setting openings 425 sized for engaging with one or more fasteners 445 located as part of the cantilever support 410.

According to one embodiment of the disclosure, the cantilever support 410 includes a first rail 430, a second rail 435, a channel 440 formed by the first and second rails 430 and 435, one or more fasteners 445, and a stabilization component 450 positioned at a second end of the cantilever support 410. In particular, a first end 432 of the first rail 430 and a first end 437 of the second rail 435 are formed as part of the upper region 400 of the third extension panel 170. However, to provide a cantilever effect, a second end 433 of the first rail 430 and a second end 438 of the second rail 435 are unsecured, as provided by a cut-out area 460 positioned adjacent to the second end 433 of the first rail 430 and the second end 438 of the second rail 435.

The channel 440 is formed between the first rail 430 and the second rail 435 and is sized to receive the cervical collar adjustment rod 420. The fasteners 445 are inward-facing protrusions positioned between the first rail 430 and the second rail 435, where these protrusions are sized to partially insert within the height-setting openings 425 of the cervical collar adjustment rod 420 when the cervical collar adjustment rod 420 is slid into the channel 440.

The left lower region 402 features a first strap slot 470, which is positioned to be in horizontal alignment with the first strap guide 134 of the first posterior panel 120 when the third extension panel 170 is attached to the first posterior panel 120. Similar in orientation, a second strap slot 475 is positioned to be in horizontal alignment with the second strap guide 135 when the third extension panel 170 is attached to the first posterior panel 120. Each of the one or more locking protrusions 140 may be position between the cantilever support 410 and a corresponding strap slot 470/480 and are sized to be securely coupled to the locking slots 130 of a posterior panel (e.g., the first posterior panel 120) as shown in FIG. 1A.

A first rounded edge 480 extends along a first perimeter section 485 of the third extension panel 170 from (i) a first end portion 486 positioned above an upper left corner of the third strap slot 470 to (ii) a second edge portion 487 positioned at an opening 441 at a first end 442 of the channel 440. Similarly, a second rounded edge 490 extends along a second perimeter section 491 of the third extension panel 170 from (i) a third end portion 492 positioned at the opening 441 of the channel 440 to (ii) a fourth end portion 493 positioned closer to a right-upper corner of the fourth strap slot 475 than the left upper corner of the fourth strap slot 475.

As further shown in FIG. 4A, a first base flange 495 extends a first lower perimeter section 496 within the left lower region 402 of the third extension panel 170, and a second base flange 497 extends from a second lower perimeter section 498 of the right lower region 404 of the third extension panel 170. The first and second base flanges 495 and 497 are configured to engage with locking slots of a posterior panel (e.g., locking channels 540-541 of the first posterior panel 120 shown in FIG. 5A).

Figure 4B:
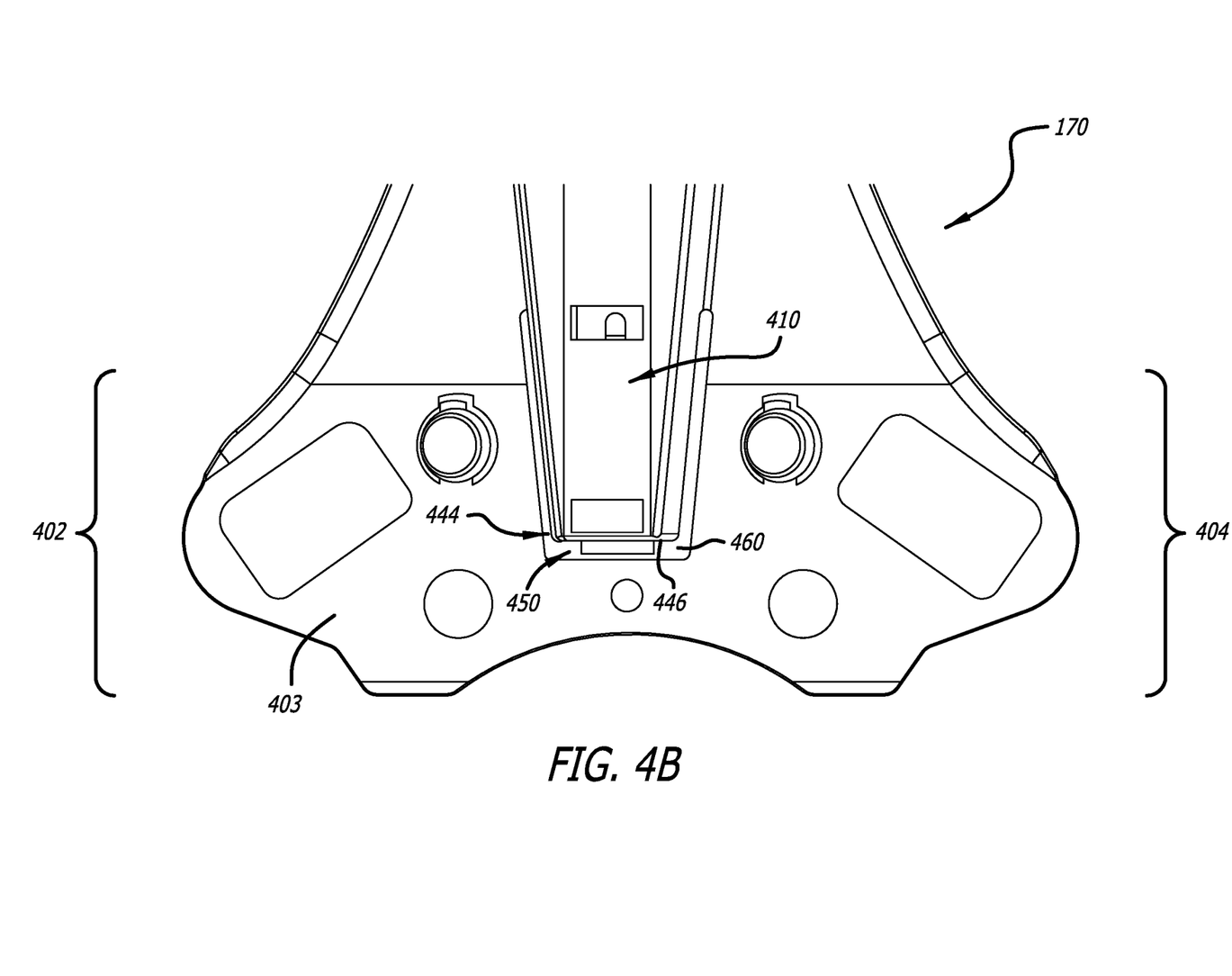
FIG. 4B is a more detailed perspective view of a stabilization component deployed on a cantilever support.

According to one embodiment of the disclosure, as shown in FIG. 4B, the cantilever support 410 further includes an enclosed second end 444 disengaged from the first lower region 402 and the second lower region 404 of the third extension panel 170 by the cut-out area 460. The stabilization component 450 is positioned to extend from a lateral side portion 446 orthogonal to a top surface 403 of the first lower region 402. For this embodiment, the stabilization component 450 is a flange member sized to be slidably coupled to the stabilization slot 136 of FIG. 1A. Upon coupling, the stabilization component 450 provides additional lateral stability for the third extension panel 170 to account for additional weight (e.g., cervical collar adjustment rod 420, etc.).

Referring to FIG. 5A, a front-facing view of the posterior bracing system 114 of FIG. 1A with the third extension panel 170 of FIGS. 4A-4B is shown. Herein, a rear portion of a cervical collar 500 is connected to a bracket 510 attached to a first end 520 of the cervical collar adjustment rod 420. The cervical collar adjustment rod 420 is inserted into the channel 440 formed by the first and second rails 430 and 435 of the cantilever support 410. Upon positioning the third extension panel 170 for attachment to the first posterior panel 120, the cantilever support 410 is positioned to rest on a posterior side 530 of the first posterior panel 120, namely the posterior surface 335 of the first posterior panel 120. In contrast, the remainder of the third extension panel 170 is positioned on an anterior side 535 of the first posterior panel 120. The third extension panel 170 is attached to the first posterior panel 120 via (i) the locking protrusions 140 inserted into the locking slots 130, (ii) the stabilization component 450 inserted into the stabilization slot 136, and (iii) base flanges 295-296 adapted for coupling to locking channels 540-541 accessible via the anterior side 535 of the first posterior panel 120.

Figure 5B:
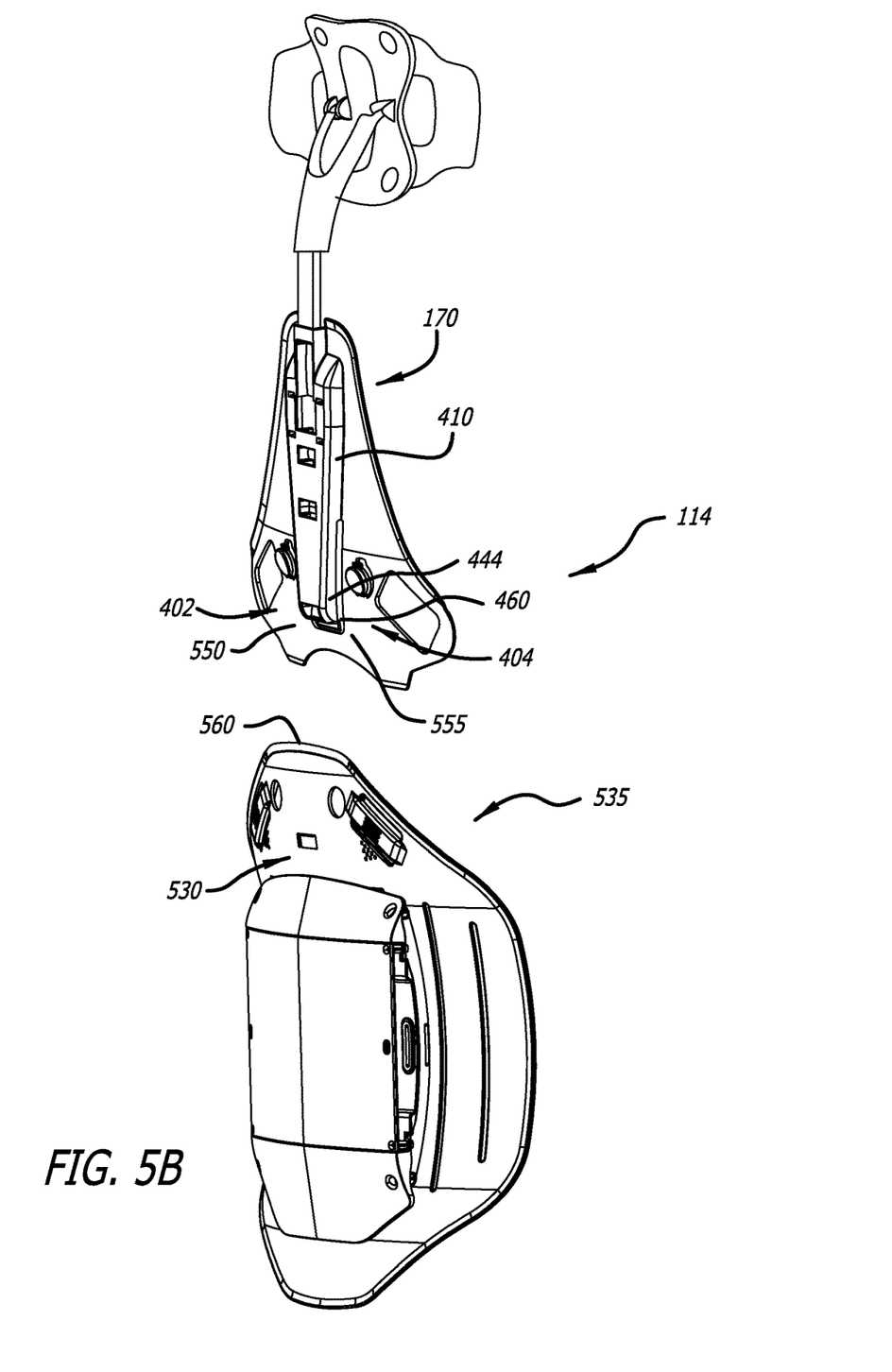
FIG. 5B is a rear-facing view of the orthopedic brace of FIG. 5A implemented with the third extension panel supporting an orthosis fastening subsystem.

Referring now to FIG. 5B, a rear-facing view of the posterior bracing system 114 of FIG. 1A with the third extension panel 170 of FIGS. 4A-4B is shown. Herein, the cantilever support 410 further includes the enclosed second end 444, which is disengaged from portions of the first lower region 402 and the second lower region 404 of the third extension panel 170 through the cut-out area 460. The cut-out area 460 constitutes a separation between (i) a posterior surface 550 for the left lower region 402 of the third extension panel 170 and the first rail 430 of the cantilever support 410 and (ii) a posterior surface 555 for the right lower region 404 of the third extension panel 170 and the second rail 435 of the cantilever support 410. At a time of connection, a top perimeter 560 of the first posterior panel 120 is inserted into the cut-out area 460 as the stabilization component 450 slidably engages to the stabilization slot 136 to provide additional lateral stability for the third extension panel 170. Hence, the cantilever support 410 is positioned on the posterior side 530 of the first posterior panel 120 while other portions of the third extension panel 170 (e.g., first and second lower regions 402 and 404) are positioned on the anterior side 535 of the first posterior panel 120.

Referring now FIG. 6, a front-facing view of an exemplary embodiment of the third extension panel 170 coupled to the first posterior panel 120 of FIGS. 5A-5B is shown. The cervical collar adjustment rod 420 is inserted into the channel 440 formed by the first and second rails 430 and 435 of the cantilever support 410. As attaching the third extension panel 170 to the first posterior panel 120, the base flanges 495-496 are positioned to partially reside within the locking channels 540-541, respectively. In particular, according to one embodiment of the disclosure, the base flanges 495-496 are flared out posteriorly for partial insertion through and engagement with the locking channels 540-541, respectively. Additionally, the locking protrusions 140 would be inserted into the locking slots of the first posterior panel 120 while the first and second strap slots 470 and 475 would be aligned with the first and second strap guides 134 and 135, respectively.

As shown, the third extension panel 170 features a curved perimeter portion 600 between the first base flange 495 and the second base flange 496. The curved perimeter portion 600 is oriented above a mounting aperture 610 for mounting of the posterior cover 190 to a rear-facing side of the posterior panel 120. As shown, the curved perimeter portion 600 allows for access to allow the posterior cover 190 to be installed after the third extension panel 170 has been installed.

Figure 7:
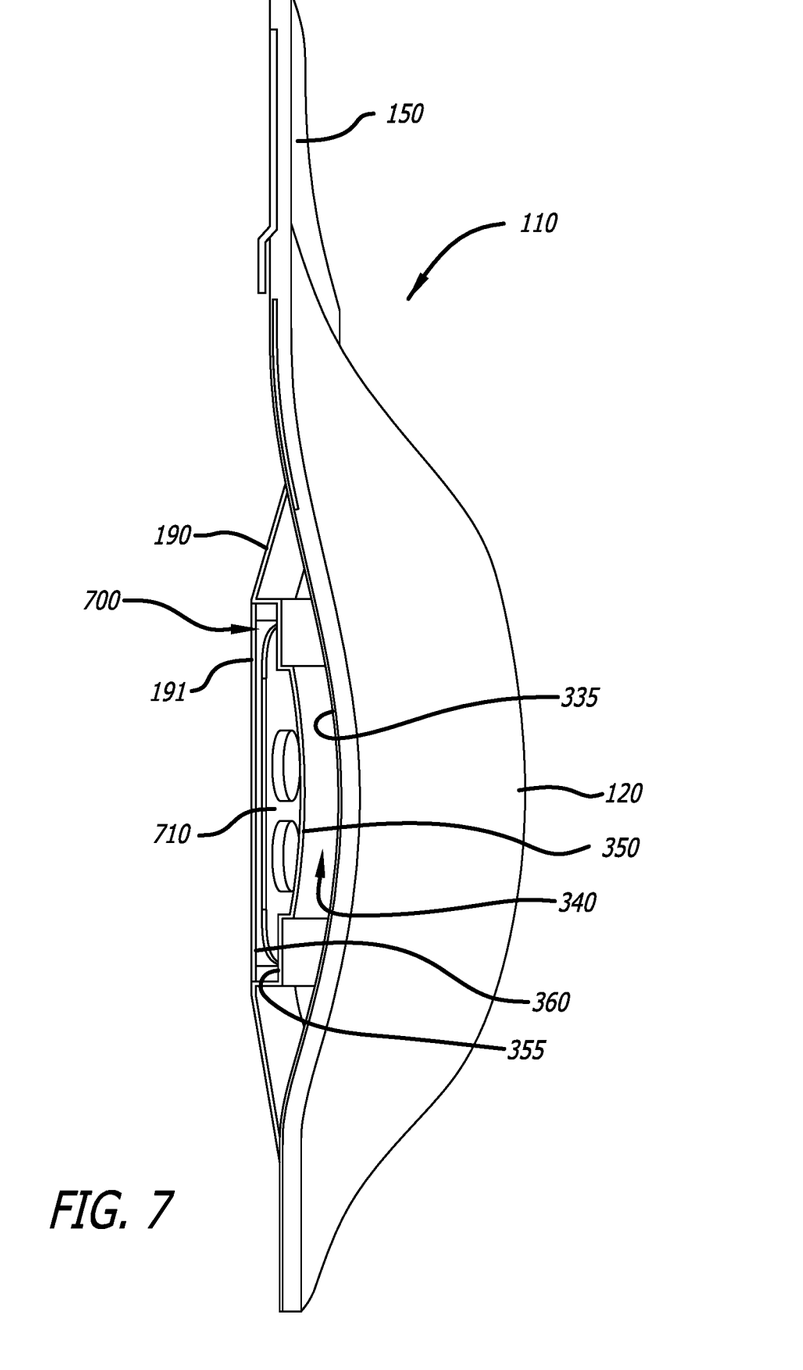
FIG. 7 is a side perspective of the orthopedic brace of FIG. 6 illustrating a low-profile design.

Referring to FIG. 7, a side perspective of one of the posterior bracing systems 100 of FIG. 1A with the first extension panel 150 of FIGS. 2A-2B is shown. Herein, the posterior bracing system 110 (e.g., first posterior bracing system 110) features a low-profile design, where the posterior cover 190 is positioned to cover a portion of a posterior surface 335 of the first posterior panel 120 to house telescopic lateral panels 345 (see FIG. 3) configured to extend from the first protective chamber 340. The first protective chamber 340 is a partially enclosed spacing between the posterior surface 335 of the posterior panel 120 and an anterior surface 350 of the posterior cover 190. A recessed area 700 formed between the anterior surface 360 of the pulley cover 191 and the posterior surface 355 of the posterior cover 190 to form the second protective chamber 370 to house a pulley subsystem 710.

In the foregoing description, the invention is described with reference to specific exemplary embodiments thereof. However, it will be evident that various modifications and changes may be made thereto without departing from the broader spirit and scope of the invention as set forth in the appended claims. Images of a prototype of the orthopedic brace are included in the Appendix and the illustrative description associated with these images are incorporated by reference herein.

What is claimed is:

1. A posterior bracing system operating as part of an orthopedic brace, the posterior bracing system comprising:
   a posterior panel including a plurality of locking slots; and
   a first extension panel removably coupled to the posterior panel, the first extension panel including a plurality of locking protrusions corresponding to and removably coupled to the plurality of locking slots,
   wherein the first extension panel includes a cantilever support configured with an open first end to receive an adjustment rod for attachment to a rear portion of a cervical collar and a closed second end including a stabilization component configured to be inserted into and secured by a stabilization slot deployed on the posterior panel to provide lateral stability.

2. The posterior bracing system of claim 1, wherein the first extension panel includes the cantilever support positioned lengthwise between a left lower region and a right lower region of the first extension panel.

3. The posterior bracing system of claim 2, wherein the cantilever support includes the open first end to provide access to a channel formed within the cantilever support and configured to receive the adjustment rod.

4. The posterior bracing system of claim 3, wherein the open first end is formed by a first end of a first rail and a first end of a second rail being part of an upper region of the first extension panel and while a second end of the first rail and a second end of the second rail are unsecured as provided by a cut-out area of the first extension panel positioned adjacent to the second end of the first rail and the second end of the second rail.

5. The posterior bracing system of claim 1, wherein the stabilization component is deployed on the posterior panel between the plurality of locking slots.

6. The posterior bracing system of claim 1 further comprises a second extension panel that is different from the first extension panel, wherein the second extension panel is removable and substitutable for the first extension panel and the second extension panel has a length greater than a length of the first extension panel.

7. The posterior bracing system of claim 1, wherein the first extension panel includes a fastening clip positioned to be securely coupled to a top edge of the posterior panel when the plurality of locking protrusions of the first extension panel are inserted and coupled to the plurality of locking slots of the posterior panel.

8. The posterior bracing system of claim 7, wherein the fastening clip is further positioned substantially centered between the plurality of locking protrusions.

9. The posterior bracing system of claim 1, wherein the first extension panel includes a plurality of strap slots positioned to receive an adjustable strap configured to be positioned over a shoulder of a user, the plurality of strap slots is configured to be positioned within an upper region of the extension panel while a fastening clip is configured to be positioned with a middle region of the first extension panel.

10. The posterior bracing system of claim 1, wherein the posterior panel includes a first strap guide outwardly positioned from a first locking slot of the plurality of locking slots of the posterior panel and a second strap guide outwardly positioned from a second locking slot of the plurality of locking slots of the posterior panel.

11. The posterior bracing system of claim 10, wherein the first extension panel includes a first strap slot and a second strap slot positioned to be in alignment with the first strap guide and the second strap guide of the posterior panel when the first extension panel is securely coupled to the posterior panel.

12. The posterior bracing system of claim 1, wherein the posterior panel, when worn, is configured to be positioned adjacent to the lumbar vertebrae and a lower portion of a thoracic vertebrae of a wearer and the first extension panel, when worn, is configured to be positioned adjacent to a higher portion of the thoracic vertebrae and a lower portion of the cervical vertebra of the wearer.

13. An extension panel comprising:
a planar panel including a top region, a middle region and a lower region;
a plurality of locking protrusions positioned within the middle region of the planar panel, the plurality of locking protrusions are configured for secure attachment to a plurality of locking slots positioned within a posterior panel to form an orthopedic brace; and
a cantilever support configured with an open first end to receive an adjustment rod for attachment to a rear portion of a cervical collar and a closed second end including a stabilization component configured to be inserted into and secured by a stabilization slot deployed on the posterior panel to provide lateral stability.

14. The extension panel of claim 13, wherein the cantilever support extends lengthwise from the top region of the planar panel to the lower region of the planar panel.

15. The extension panel of claim 14, wherein the cantilever support extends into the lower region of the planar panel between a left lower region and a right lower region forming the lower region.

16. The extension panel of claim 14, wherein the cantilever support includes the open first end to provide access to a channel formed within the cantilever support and configured to receive the adjustment rod.

17. The extension panel of claim 16, wherein the open first end is formed by a first end of a first rail and a first end of a second rail being part of the top region of the planar panel and while a second end of the first rail and a second end of the second rail are unsecured as provided by a cut-out area of the planar panel positioned adjacent to the second end of the first rail and the second end of the second rail.

18. The extension panel of claim 13, wherein the stabilization component is deployed on the posterior panel between the plurality of locking slots corresponding to the plurality of locking protrusions.

19. The extension panel of claim 18 further comprising:
a fastening clip positioned between the plurality of locking protrusions for coupling to a top edge of the posterior panel when the plurality of locking protrusions of the planar panel are inserted and coupled to the plurality of locking slots of the posterior panel.

20. The extension panel of claim 19, wherein the fastening clip is further positioned substantially centered between the plurality of locking protrusions.

21. A posterior bracing system operating as part of an orthopedic brace, the posterior bracing system comprising:
a posterior panel including a plurality of locking slots; and
a first extension panel removably coupled to the posterior panel, the first extension panel including a plurality of locking protrusions corresponding to and removably coupled to the plurality of locking slots,
wherein, when the first extension panel is attached to the posterior panel by insertion of the plurality of locking protrusions of the first extension panel into the plurality of locking slots of the posterior panel, lower regions of the first extension panel are positioned below an upper edge of the posterior panel, and
wherein the first extension panel includes a cantilever support configured with an open first end to receive an adjustment rod for attachment to a rear portion of a cervical collar and a closed second end including a stabilization component configured to be inserted into and secured by a stabilization slot deployed on the posterior panel to provide lateral stability.

\* \* \* \* \*